United States Patent
Topchy et al.

(10) Patent No.: US 11,652,859 B2
(45) Date of Patent: May 16, 2023

(54) METHODS AND APPARATUS TO IDENTIFY STREAMING SESSIONS

(71) Applicant: The Nielsen Company (US), LLC, New York, NY (US)

(72) Inventors: Alexander Topchy, New Port Richey, FL (US); Jeremey M. Davis, New Port Richey, FL (US); Khaldun Karazoun, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/142,905

(22) Filed: Jan. 6, 2021

(65) Prior Publication Data

US 2021/0211478 A1 Jul. 8, 2021

Related U.S. Application Data

(60) Provisional application No. 62/957,314, filed on Jan. 6, 2020.

(51) Int. Cl.
*H04L 65/60* (2022.01)
*H04L 65/1069* (2022.01)
(Continued)

(52) U.S. Cl.
CPC .......... *H04L 65/60* (2013.01); *H04L 65/1069* (2013.01); *H04L 65/612* (2022.05);
(Continued)

(58) Field of Classification Search
CPC .... H04N 21/24; H04N 21/812; H04N 21/835; H04L 65/60; H04L 65/1069; H04L 65/4084; H04L 65/80
See application file for complete search history.

(56) References Cited

U.S. PATENT DOCUMENTS 9,058,645 B1 * 6/2015 Corley .............. H04N 21/8358
10,489,805 B2 11/2019 Alla et al.
(Continued)

FOREIGN PATENT DOCUMENTS

KR 1020140044837 4/2014
KR 1020150023340 3/2015

OTHER PUBLICATIONS

International Searching Authority, "International Search Report and Written Opinion," issued in connection with International Patent Application No. PCT/US2021/012342, dated Apr. 23, 2021, 10 pages.

(Continued)

*Primary Examiner* — Randy A Flynn
(74) *Attorney, Agent, or Firm* — Hanley, Flight & Zimmerman (57) ABSTRACT

Methods, apparatus, systems and articles of manufacture for identifying streaming sessions are disclosed. An example apparatus includes an audience measurer to determine an identifier for a commercial presented at a media presentation device, and to determine a time at which the commercial was presented. The example apparatus also includes a log analyzer to compare the identifier and the time to a streaming session log from a streaming service provider (SSP) to identify a streaming session in which the commercial associated with the identifier was presented at the time. The example apparatus also includes a panelist matcher to associate, based on the comparison, a panelist identifier with a streaming session identifier corresponding to the streaming session.

23 Claims, 5 Drawing Sheets

(51) Int. Cl.
*H04L 65/80* (2022.01)
*H04N 21/24* (2011.01)
*H04N 21/81* (2011.01)
*H04N 21/835* (2011.01)
*H04L 65/612* (2022.01)

(52) U.S. Cl.
CPC ............. *H04L 65/80* (2013.01); *H04N 21/24* (2013.01); *H04N 21/812* (2013.01); *H04N 21/835* (2013.01)

(56) References Cited

U.S. PATENT DOCUMENTS

| | | |
|---|---|---|
| 10,791,042 B2 | 9/2020 | Ramaswamy et al. |
| 2010/0162288 A1* | 6/2010 | Huffman .......... H04N 21/44209 725/22 |
| 2010/0257548 A1 | 10/2010 | Lee et al. |
| 2015/0089523 A1 | 3/2015 | Volovich et al. |
| 2016/0066005 A1* | 3/2016 | Davis .................... H04N 21/258 725/19 |
| 2018/0227108 A1* | 8/2018 | Zhu ....................... H04L 1/0015 |
| 2019/0208269 A1 | 7/2019 | Besehanic |

OTHER PUBLICATIONS

International Searching Authority, "International Preliminary Report on Patentability," issued in connection with International Application No. PCT/US2021/012342, dated Jul. 12, 2022, 5 pages.

* cited by examiner

METHODS AND APPARATUS TO IDENTIFY STREAMING SESSIONS

RELATED APPLICATION

This patent claims priority to U.S. Patent Application Ser. No. 62/957,314, which was filed on Jan. 6, 2020, and is hereby incorporated herein by reference in its entirety.

FIELD OF THE DISCLOSURE

This disclosure relates generally to media monitoring and, more particularly, to methods and apparatus to identify streaming sessions.

BACKGROUND

A streaming service provider (SSP) has a large library of content that can be received by users on their viewing devices (e.g., smart TVs, smart phones, personal computers, etc.). Such devices may enable viewing through a dedicated application (e.g., an executable application, a web application, etc.). The application may be offered by the SSP, available for download/installation on the device, and/or installed by a manufacturer and/or distributor of the device.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

Streaming Service Providers (SSPs) want to determine audience measurement data for panelists viewing their streams. Each streaming session includes a number of Video clips (main content) and Advertisement clips played on the user device. The SSP is particularly interested in getting audience composition data from the audience measurement entity (e.g., because the SSP already has media streaming logs of the media sent to devices). Specifically, SSPs expect that an audience measurement entity can assign viewers (e.g., assign demographic information from panelists) to each streaming session of a panelist.

Example methods and apparatus disclosed herein facilitate the assignment of audience measurement entity panelists to viewing sessions. An example method includes inserting commercials (e.g., by a streaming service provider) into media content of a streaming session presented at a media presentation device of a panelist. For example, the commercials are watermarked so that each commercial can be identified (e.g., by an Advertisement ID). The example method also includes determining an identifier and a time of presentation for a commercial presented in the streaming session. The example method also includes comparing the identifier and the time to a streaming session log from a streaming service provider to identify a streaming session in which the commercial associated with the identifier was presented at the time. The example method also includes associating (e.g., by an audience measurement entity) a panelist identifier related to the media presentation device with a streaming session identifier related to the streaming session based on the comparison. In this way, for instance, the audience measurement entity can assign a panelist to the streaming session.

Figure 1:
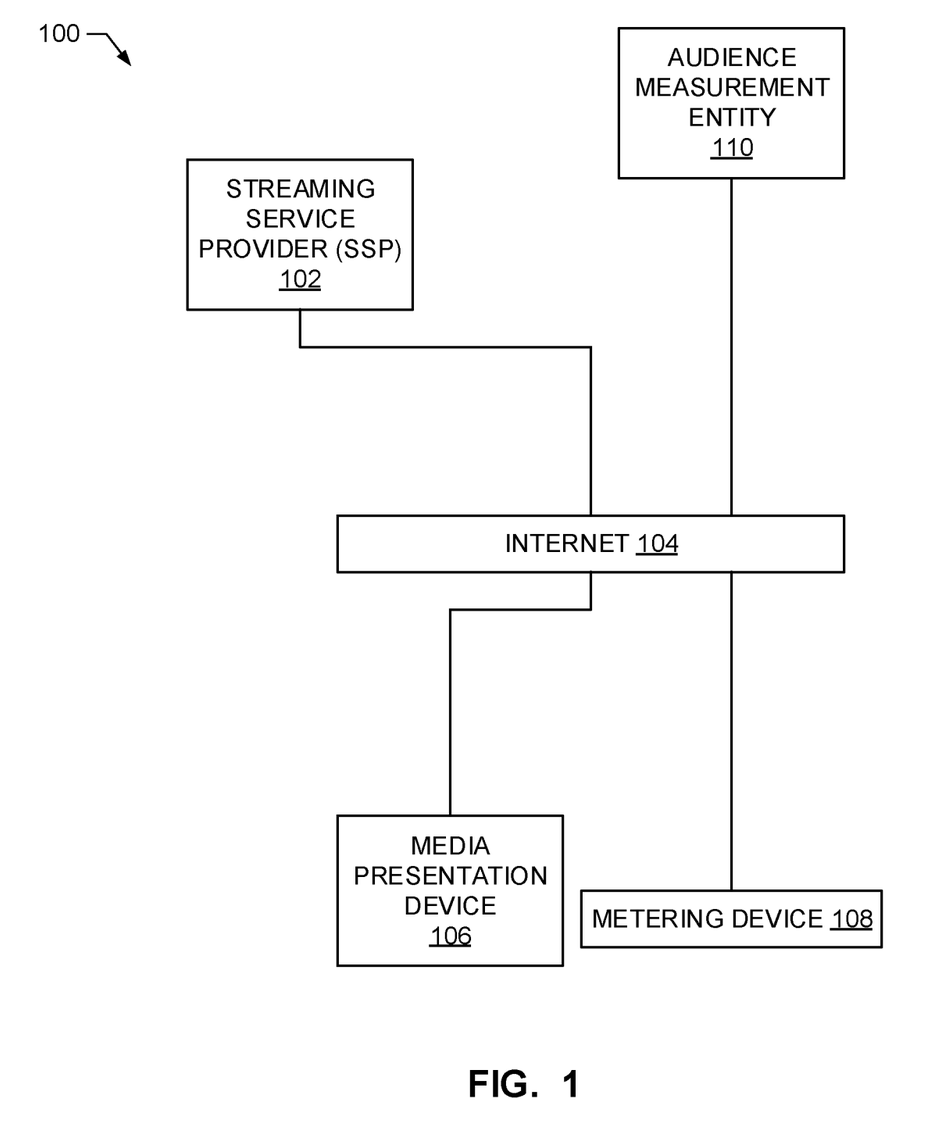
FIG. 1 is a block diagram of an example environment in which examples disclosed herein may be implemented.

FIG. 1 is a block diagram of an example environment 100 in which examples disclosed herein can be implemented. In the example environment 100 depicted in FIG. 1, an example SSP 102 transmits streaming media (e.g., programs, commercials, etc.) via the Internet 104 to a media presentation device 106. Further, an example metering device 108 collects audience measurement information about the presentation of media on the media presentation device 106. In turn, the example metering device 108 transmits the collected audience measurement information to an audience measurement entity 110 via the Internet 104.

While a single SSP 102 is illustrated, the environment 100 may include any number of SSPs and the SSP 102 may include any number of components and/or computing devices at any number of locations (e.g., servers that are physically distributed throughout a geographic region). Further, any other appropriate network topology can be implemented instead.

The Internet 104 may be replaced or complemented with any other network(s) (e.g., a wide area network, a local area network, etc.).

The media presentation device 106 of the illustrated example is a smart television (e.g., a television that includes a computing device coupled to a network to enable at least one of streaming media via the network, browsing webpages via the network, executing applications, etc.). Alternatively, the media presentation device 106 may be any other type of device (e.g., a smart phone, a personal computer, a set top box, etc.). While a single media presentation location including the media presentation device 106 is illustrated, the environment 100 may include any number of media presentation locations and any number of media presentation devices. The media presentation device 106 includes an application for presenting the media from the SSP 102. Typically, the SSP 102 includes a unique client player identifier or application identifier corresponding to a player and/or device streaming their content. This identifier information may be set and/or defined during the streaming initialization and/or may be transmitted via a backchannel when a clip is being streamed to the media presentation device 106.

The metering device 108 of the illustrated example is implemented as a panelist metering device supplied to a media presentation location (e.g., a home of a panelist) by the audience measurement entity 110. The example metering device 108 monitors the presentation of media by the media presentation device 106 and transmits collected audience measurement information to the audience measurement entity 110 via the Internet 104. For example, the metering device 108 may include a microphone or other capture device to capture the media, characteristics of the media, etc. to identify the media (e.g., to collect watermarks, signatures, embedded metadata, etc.). The metering device 108 may additionally or alternatively capture information about people present in the room during the media presentation (e.g., utilizing cameras, user input, sensors, etc.). While the metering device 108 is illustrated in the example of FIG. 1 as a device separate from the media presentation device 106, in some examples, the metering device 108 may alternatively be integrated with media presentation device 106 (e.g., as an application of the media presentation device 106).

The audience measurement entity 110 receives the audience measurement information from the metering device 108. The audience measurement entity 110 may perform numerous actions using the audience measurement information such as, for example, aggregating information, analyzing the information to determine an identity for the media, analyzing the information to determine an identity for the audience, generating reports, linking the information with information from other sources (e.g., information from the SSP 102), and/or other any actions.

Several example approaches to facilitate the association of panelists with streaming sessions are disclosed. The disclosed example approaches may be utilized individually or in combination. In other words, any aspect of the approaches can be implemented in any other of the example approaches.

In a first example approach, the SSP 102 inserts commercials into the media transmitted to the media presentation device 106. Commercial insertion is controlled by the SSP 102 in terms of timing and choice of advertisement identifier (Ad ID). According to the first example approach, commercials are watermarked with a message having a unique Ad ID for each commercial (e.g., the SSP 102 or the commercial provider inserts unique Ad IDs into the commercials, the audience measurement entity 110 provides a watermarking device and/or directs the SSP to watermark the commercials, etc.).

When a commercial is presented by the media presentation device 106, the metering device 108 detects the watermark associated with the commercial and logs the time (e.g., as a time stamp, a time range, a time value, etc.) of the presentation. Such detections can occur more than one time with different commercials viewed throughout the streaming session. As a result, a log of detections of Ad IDs and corresponding times is generated and stored at the metering device 108. For example, a sequence of one or more pairs (e.g., {Ad Id1, Time 1}, {Ad Id2, Time 2}, {Ad Id3, Time 3}, . . . , etc.) is observed (and/or stored) at the metering device 108. Further, the collected audience measurement information is associated with the panelist that is associated with the metering device 108. In turn, the example metering device 108 transmits the log to the audience measurement entity 110.

According to the first example approach, the SSP 102 provides a streaming session log to the audience measurement entity 110. The streaming session log includes streaming session identifiers, ground truth data indicative of the Ad IDs, and indication of a time of presentation for each commercial (associated with an Ad ID) used in the respective streaming session. The audience measurement entity 110 matches the streaming session log with the audience measurement information from the metering device 108 to identify a matching streaming session for the audience measurement information. For example, the particular Ad IDs and presentation times may be unique enough that information from the metering device 108 will be matched to a single streaming session from the streaming session log. Accordingly, the panelist identifier associated with the audience measurement information from the metering device 108 can be matched to a streaming session identifier from the streaming session log. In some examples, to further reduce the possibility of two streaming sessions having matching Ad IDs and presentation times, the SSP 102 can employ a restriction rule to choose different commercials for presentation to different media presentation devices 106 at the same time of streaming.

In some examples, watermarking of the commercials can be done once in offline mode (e.g., prior to the time of presentation because the watermark does not need to include presentation-time information such as the time of presentation). However, in some systems, the watermark payload for Ads may be generated dynamically in real-time. For example, real-time encoding can insert a unique session ID or its equivalent, for instance it can insert unique target player identifier, or it can insert unique IP address for the end-point device. This information or any other available information can be used to supplement the matching process to further uniquely identify a session.

Once correspondence between a streaming session identifier and the panelist is established, the example audience measurement entity 110 prepares and/or generates audience data reports for the SSP 102 in aggregate for a number of viewing sessions, or parts of a viewing session. In some examples, the audience measurement entity 110 may provide a report of the links between streaming session identifiers and panelist identifiers, panelist demographic information, etc. Alternatively, the audience measurement entity 110 may aggregate information about the panelist demographics and the streaming session identifier to protect the identities of particular panelists and/or to prevent the SSP 102 from targeting information to known panelists.

According to a second example approach, the audience measurement entity 110 requests the SSP 102 to provide a probing tool to be installed in and/or coupled to the metering device 108 and/or the media presentation device 106 to allow the metering device 108 to discover a player identifier that uniquely identifies the media presentation device 106 (e.g., uniquely identifies the application for playing the media on the streaming media on the media presentation device 106). Accordingly, the metering device 108 can link the panelist identifier with the player identifier. In turn, the example audience measurement entity 110 can then receive a table linking the player identifiers with session identifiers from the SSP 102, and provide the linking of player identifiers with panelist identifiers (or information about the panelists (e.g., demographic information) to the SSP 102.

According to a third example approach, the audience measurement entity 110 instructs a panelist associated with the media presentation device 106 to open the application for playing media from the SSP 102 and play a pre-generated media clip. For example, the particular media clip can be pre-generated by the audience measurement entity 110 (or the SSP 102) to uniquely associate the media presentation device 106 with media content from the SSP 102 (and/or with a particular SSP application playing the pre-generated media clip on the media presentation device 106). For example, the pre-generated media clip includes a unique URL for the panelist to obtain the pre-generated media clip from the SSP 102. The audience measurement entity 110 provides information linking the panelist to the unique media clip. In some examples, the audience measurement entity 110 provides a unique identifier (e.g., a unique identifier that is different from the actual panelist identifier for privacy reasons) of the panelist that was instructed to load the particular pre-generated media clip. For example, the unique identifier includes a scrambled version of the panelist identifier. In some such examples, the audience measurement entity 110 scrambles the panelist identifier to generate the unique identifier for the panelist. In some examples, when the media presentation device 106 submits a request to the SSP 102 for a "personalized" clip (e.g., a URL address of the pre-generated media clip), the SSP 102 associates the media presentation device 106 (e.g., as a result of the SSP 102 receiving information about the SSP application on device 106 that requested the media) with information about the panelist (e.g., the clip/URL is uniquely associated with the panelist).

Once the SSP 102 has a link between a panelist identifier (or substitute identifier) with a player identifier, the SSP 102 can provide information about streaming sessions to the audience measurement entity 110 for the audience measurement entity 110 to use in generating reports of panelist activities and/or other panelist information (e.g., by generating reports that include demographic information).

In some examples, the audience measurement entity 110 may provide the instruction to the panelist to load the special clip once when activating (e.g., may withhold incentives or full activation until the special clip has been played). Alternatively or additionally, in other examples, a technician of the audience measurement entity 110 may visit the panelist and load the clip during activation of an account of the panelist with the audience measurement entity 110.

In some examples, if the panelist obtains another media presentation device, then the panelist can be requested to load the same pre-generated clip on the newly obtained device as well and/or a technician may load the pre-generated clip on the newly obtained device.

According to a fourth example approach, if the SSP 102 does not have an explicit player or client identifier in their application, the SSP 102 still collects some information that may be utilized to uniquely identify the client (e.g. internet protocol (IP) address, device model, operating system version, device hardware identifiers, etc.). Thus, according to the fourth example approach, the collected information may be utilized to perform the third example approach in place of the player identifier.

Other example approaches are possible as well within the scope of the present disclosure. Additionally or alternatively, in some examples, the functions described for each of the examples above can be combined and/or implemented using fewer or more devices.

Figure 2:
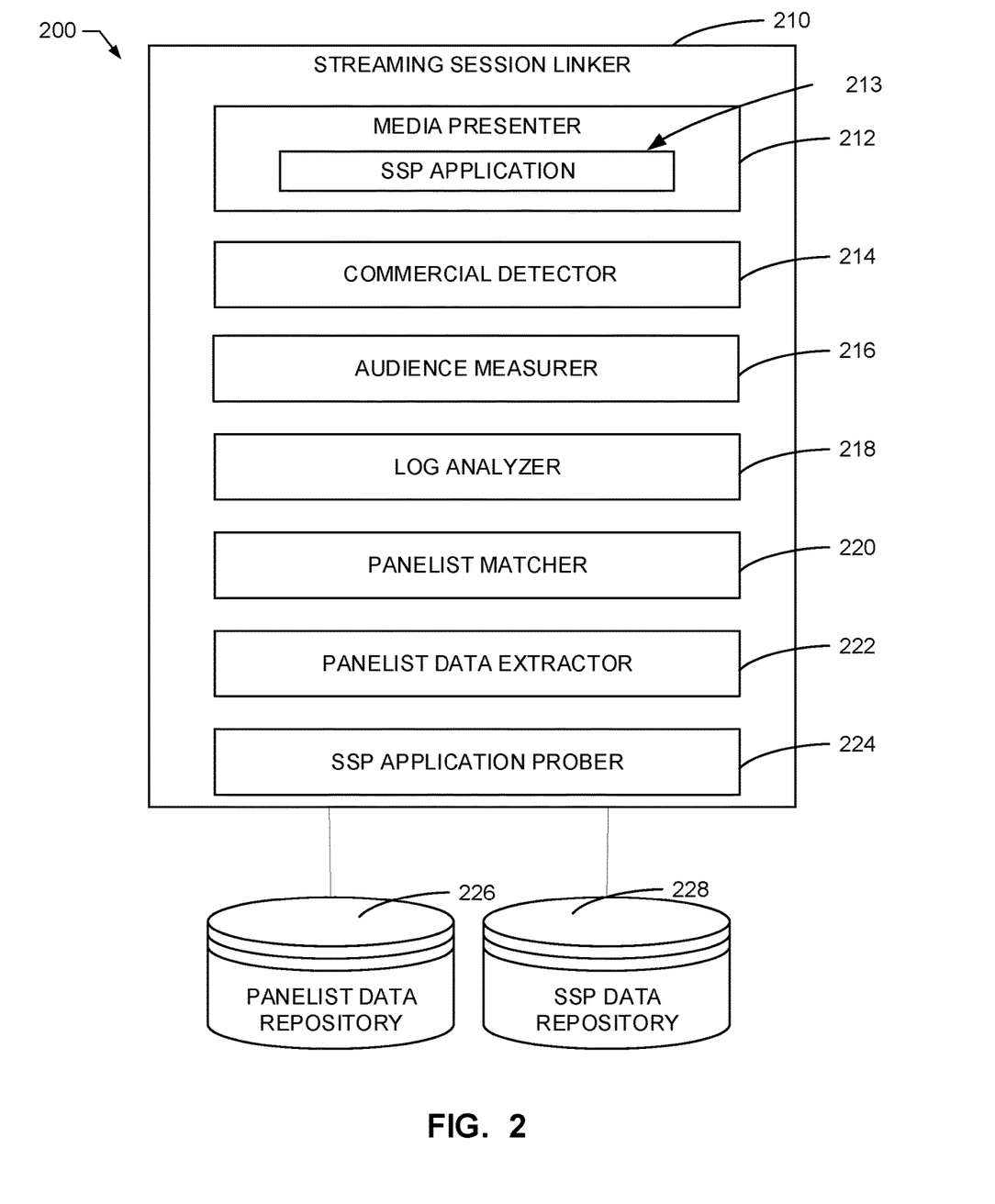
FIG. 2 is a schematic illustration of an example panelist analyzer system constructed in accordance with teachings of this disclosure to identify streaming sessions.

FIG. 2 is a schematic illustration of an example panelist analyzer system 200 constructed in accordance with teachings of this disclosure to identify streaming sessions. As shown in the illustrated example of FIG. 2, the panelist analyzer system 200 includes an example streaming session linker 210, which can be implemented using any of the SSP 102, audience measurement entity 110, media presentation device 106, and/or metering device 108, for example, to implement examples disclosed herein. Further, as shown, the panelist analyzer system 200 includes panelist data repository 226 and SSP data repository 228.

As shown in FIG. 2, the example streaming session linker 210 includes a media presenter 212, a commercial detector 214, an audience measurer 216, a log analyzer 218, a panelist matcher 220, a panelist data extractor 222, an SSP application prober 224.

The media presenter 212 of the illustrated example presents media in a streaming session (e.g., video, audio, etc.) at the media presentation device 102. For example, the media presenter 212 may execute software that reads data packets, which are associated with a streaming session and received from the SSP 102, and convert the packets into signals to be provided to the media presentation device 106 (e.g., display, etc.) for presentation of media content (e.g., media clip, a sound clip, video, etc.).

In this example, the media presenter 212 includes an example SSP application 213. The SSP application 213, for example, may include program instructions specific for reading (e.g., decrypting) streaming session data transmitted by SSP 102. In other examples, however, the media presenter 212 can be implemented without the SSP application 213.

The example commercial detector 214 detects one or more commercials (e.g., advertisement content) incorporated in media content (e.g., media clip, etc.) received from the SSP 102 in a streaming session. In some examples, the commercial detector 214 identifies each detected commercial (e.g., by determining an advertisement ID (Ad ID) based on a watermark incorporated in the commercial, etc.) and a time and/or time frame at which the commercial is presented (e.g., in the panelist data repository 226, etc.).

The audience measurer 216 of the illustrated example tracks and stores (e.g., in the panelist data repository 225) an indication of the commercials presented via the media presenter 212 for a particular media presentation device (e.g., the media presentation device 106). For example, audience measurer 216 stores an Ad ID and a time for each commercial presented to the audience of the particular media presentation device.

The example log analyzer 218 stores a log of streaming sessions (e.g., in the SSP data repository 228) broadcast by the SSP 102 to one or more media presentation devices (e.g., the media presentation devices 106). For example, the log analyzer 218 can store, for each streaming session, a streaming session identifier, a player identifier (e.g., an identifier that identifies a specific instance of SSP application 212 that accessed the streaming session), an IP address of the media presentation device 106, one or more advertisement IDs of commercials presented in the streaming sessions, etc. amongst other possible information pertaining to the streaming session.

In some examples, the log analyzer 218 provides a streaming session log to an external server for identifying a panelist device that received the streaming sessions in the streaming session log. Referring back to FIG. 1, for example, the SSP provider 102 may provide, for receipt by audience measurement entity 110, a log of streaming sessions broadcast to the media presentation device 106.

The panelist matcher 220 associates a panelist ID with one or more streaming sessions in a log provided by the log analyzer 218. In a first example, the panelist matcher 220 (e.g., at the audience measurement entity 110) compares Ad IDs and times of commercials included in a streaming session with those detected by the audience measurer 216 (e.g., at a specific metering device 108) to identify a panelist ID associated with the specific metering device 108. In a second example, the panelist matcher 220 identifies the panelist ID by comparing an IP address of the media presentation device 106 provided in the streaming session log to a corresponding IP address of one or more devices associated with a panelist ID.

The example panelist data extractor 222 extracts (e.g., from the panelist data repository 226) and/or transmits data pertaining to a particular panelist associated with one or more streaming sessions. For example, the panelist data extractor 222 may provide demographic information, viewing preferences, and/or other information pertaining to one or more user devices of a user that viewed one or more streaming sessions indicated by the log analyzer 218.

The SSP application prober 224 of the illustrated example associates an instance of the SSP application 213 that accessed a particular streaming session with a panelist. For example, the SSP application prober 224 includes a probing tool (e.g., software, firmware, application programming interface, hardware, etc.) that is authorized (e.g., authorized by the SSP 102) to receive a player identifier from the SSP application 213 that associates the instance of the SSP application 213 with streaming sessions accessed by the SSP application 213. In this example, the probing tool can be installed onto the metering device 108 and/or the media presentation device 106. The probing tool can interact with SSP application 213 to obtain such an identifier. In another example, the SSP application prober 224 can generate a key (e.g., encryption key, etc.) based on one or more system parameters of the panelist analyzer system 200 (e.g., hardware specifications, IP address, etc.) to uniquely identify the instance of the SSP application 213 (and/or the media presentation device 106) that receives a specific streaming session from SSP 102.

In this example, the panelist data repository 226 is at least one data storage that includes information mapped to one or more panelists. Each panelist may correspond to a user that has one or more user devices similar to the media presentation device 106. Further, each record in panelist data repository 226 may include information pertaining to the panelist such as demographic information, user preferences, streaming session history, Ad IDs of commercials included in streaming sessions accessed by the panelist, among other information. To that end, in some examples, the panelist data repository 226 includes a first database managed by the user device (e.g., the metering device 108 and/or the media presentation device 106), and a second database managed by a remote server (e.g., audience measurement entity 110). In other examples, the repository 226 may include fewer or more databases.

The SSP data repository 228 of the illustrated example can include records of streaming session logs broadcast by a SSP (e.g., the SSP 102) for presentation at one or more user devices (e.g., the media presentation device 106). To that end, the example SSP data repository 228 can be implemented as one or more databases and/or other types of data structures. In one example, the SSP data repository 228 includes a database that is at least partially managed by (and/or stored at) the SSP 102. For example, the SSP data repository 228 can include streaming session identifiers that identify each streaming session broadcast to the media presentation device 106, as well as other information pertaining to the streaming session (e.g., time of broadcast, IP address, and/or Ad IDs, etc.).

While an example manner of implementing the example panelist analyzer system 200 of FIG. 1 is illustrated in FIG. 2, one or more of the elements, processes and/or devices illustrated in FIG. 2 may be combined, divided, re-arranged, omitted, eliminated and/or implemented in any other way. Further, the example SSP 102, the example media presentation device 106, the example metering device 108, the example audience measurement entity 110, the example media presenter 212, the example SSP application 213, the example commercial detector 214, the example audience measurer 216, the example log analyzer 218, the example panelist matcher 220, the example panelist data extractor 222, the example SSP application prober 224, the example panelist data repository 226, the example SSP data repository 228 and/or, more generally, the example panelist analyzer system 200 of FIG. 2 may be implemented by hardware, software, firmware and/or any combination of hardware, software and/or firmware. Thus, for example, any of the example SSP 102, the example media presentation device 106, the example metering device 108, the example audience measurement entity 110, the example media presenter 212, the example SSP application 213, the example commercial detector 214, the example audience measurer 216, the example log analyzer 218, the example panelist matcher 220, the example panelist data extractor 222, the example SSP application prober 224, the example panelist data repository 226, the example SSP data repository 228 and/or, more generally, the example panelist analyzer system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device (s) (FPLD(s)). When reading any of the apparatus or system claims of this patent to cover a purely software and/or firmware implementation, at least one of the example SSP 102, the example media presentation device 106, the example metering device 108, the example audience measurement entity 110, the example media presenter 212, the example SSP application 213, the example commercial detector 214, the example audience measurer 216, the example log analyzer 218, the example panelist matcher 220, the example panelist data extractor 222, the example SSP application prober 224, the example panelist data repository 226, and/or the example SSP data repository 228 is/are hereby expressly defined to include a non-transitory computer readable storage device or storage disk such as a memory, a digital versatile disk (DVD), a compact disk (CD), a Blu-ray disk, etc. including the software and/or firmware. Further still, the example panelist analyzer system 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
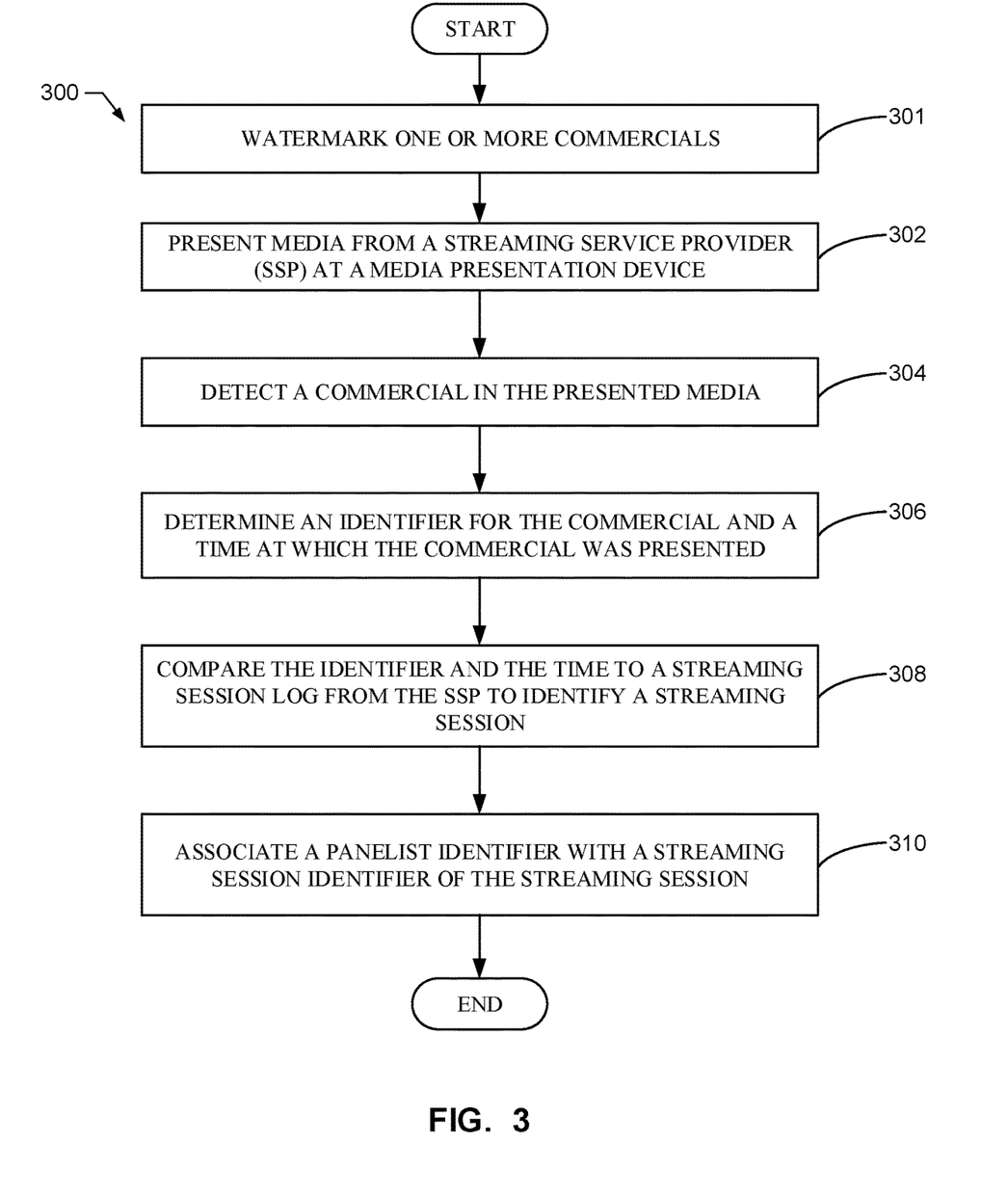
FIG. 3 is a flowchart representative of machine readable instructions that may be executed to implement the example panelist analyzer of FIG. 2.
Figure 4:
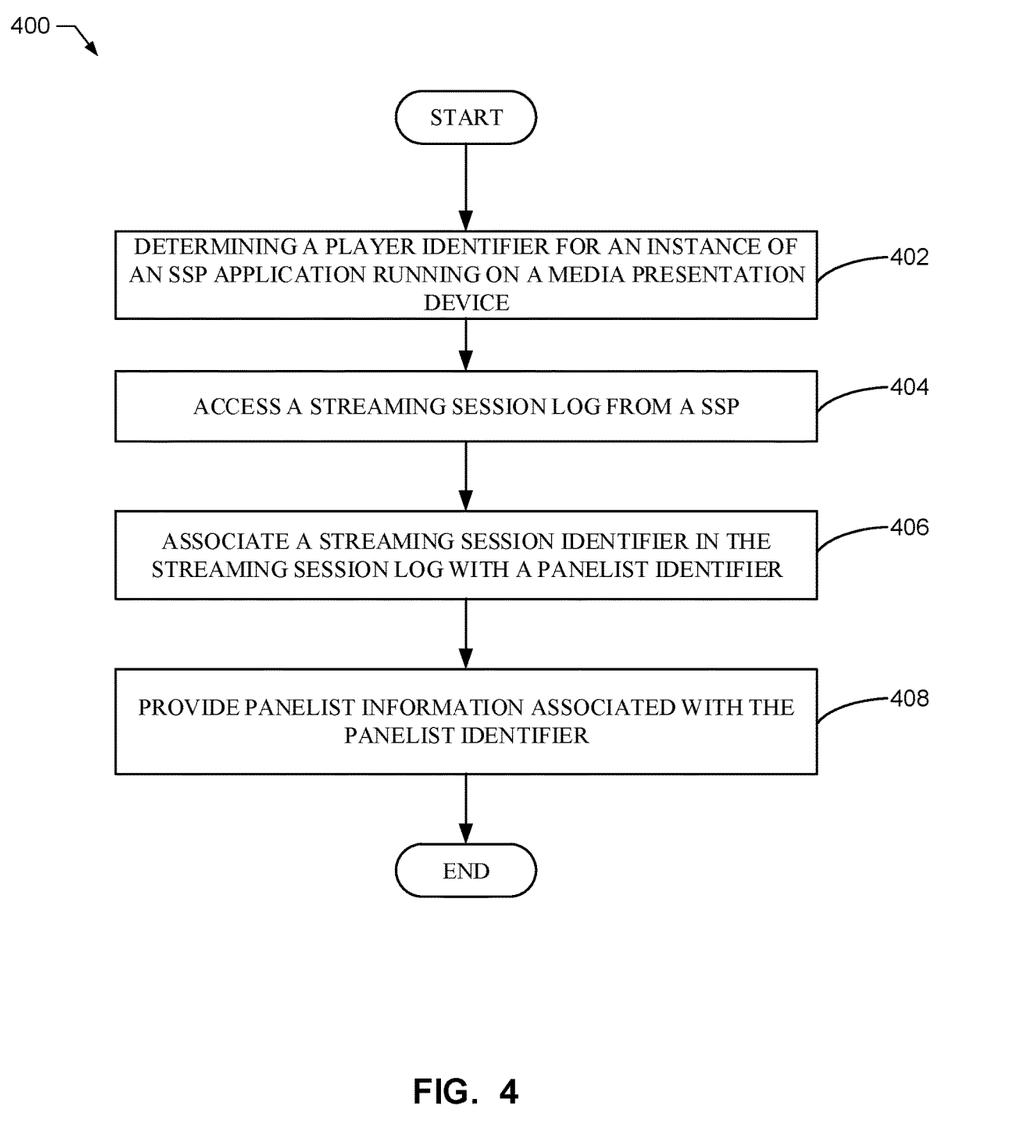
FIG. 4 is another flowchart representative of machine readable instructions that may be executed to implement the example panelist analyzer of FIG. 2.

Flowcharts representative of example hardware logic, machine readable instructions, hardware implemented state machines, and/or any combination thereof for implementing the example panelist analyzer system 200 of FIG. 2 are shown in FIGS. 3-4. The machine readable instructions may be one or more executable programs or portion(s) of an executable program for execution by a computer processor and/or processor circuitry, such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 3-4, many other methods of implementing the example panelist analyzer system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions 300 that may be executed to implement the example panelist analyzer 200 of FIG. 2.

At block 301, the example audience measurer 212 watermarks one or more commercials. In one example, the audience measurement entity 110 watermarks the commercial by inserting a watermark corresponding to an advertisement ID into the commercial, etc. In another example, the audience measurement entity 110 provides watermarking instructions to the SSP 102.

At block 302, the example media presenter 212 presents media content from a streaming service provider (SSP) at a media presentation device, such as the example media presentation device 106. Referring back to FIG. 1 the example media presentation device 106 (e.g., a television, a computer, a mobile device, a tablet, etc.) presents the media content (e.g., play a media clip, etc.) of a streaming session to a user of the media presentation device 106. For example, the media content is received by the media presentation device 106 from the SSP 102 via a network (e.g., the internet 104).

In some examples, the SSP 102 communicates with the media presentation device 106 via an SSP application (e.g., SSP application 213). For example, the SSP application 213 could include a program and/or instructions that facilitate encrypted and/or otherwise secured network communication with a server of the SSP 102.

At block 304, the example commercial detector 214 detects a commercial in the presented media content. In some examples, the metering device 108 and/or the media presentation device 106 detects watermarked advertisements included in the media content of the streaming session.

Additionally or alternatively, in some examples, the audience measurement entity 110 performs the detection of the commercial by receiving an audience measurement log from the media presentation device 106 (and/or the metering device 108) that includes an indication of one or more streaming sessions presented at the media presentation device 106 at different times. In such examples, the audience measurement entity 110 can detect commercials that were included in the one or more streaming sessions (e.g., via Ad IDs or other commercial identifying information indicated in the audience measurement log).

At block 306, the example audience measurer 216 determines an identifier for the commercial and a time at which the commercial was presented. In some examples, the determination at block 306 could be performed at the media presentation device 106 and/or the metering device 108. For instance, the media presentation device 106 and/or the metering device 108 detect watermarks and/or other commercial-identifying features (e.g., image, text, etc.) in the advertisements. In some examples, the determination of the identifier is, additionally or alternatively, performed at the audience measurement entity 110.

In some examples, the audience measurer 216 provides, to the SSP 102 via a network, watermarking instructions related to generating identifiers for commercials. In some such examples, determining the identifier is based on the identifier being generated according to the watermarking instructions. In some examples, the audience measurement entity 110 provides the watermarking instructions to the SSP 102 via the internet 104.

At block 308, the example log analyzer 218 compares the identifier and the time (determined at block 306) to a streaming session log from the SSP 102 to identify a streaming session during which the commercial was presented at the media presentation device 106. For example, a streaming session log received from the SSP 102 may include commercial identifiers and times of presentation for commercials presented during each streaming session in the log. As a result, the log analyzer 218 compares the commercial identifiers (and times of presentation) of each streaming session in the streaming session log against the identifier (and the time) determined at block 306 to find the particular streaming session that was presented at a particular media presentation device of a particular panelist. In some examples, a time error range is implemented (e.g., times with less than a 5% error from one another are regarded to be in the same time period and/or timeframe, etc.) to accommodate for any potential timing errors and/or mismatches in timing between systems and/or computing devices.

To facilitate identification of the streaming session, in some examples, the log analyzer 218 accesses the streaming session log via a network. For example, the audience measurement entity 110 retrieves the streaming session log from the SSP 102 via the internet 104.

In some examples, the audience measurer 216 determines a second identifier and a second time for a second commercial presented at the media presentation device 106. Further, in these examples, the comparing at block 308 is implemented by the example log analyzer 218 comparing the second time and the second identifier against the streaming session log to identify the streaming session during which both the commercial and the second commercial were presented. As a result, implementation of the example method 300 can facilitate distinguishing between several devices that present a same commercial at a same time by verifying whether other commercials were presented at different times during the respective streaming sessions of the devices.

In some examples, the audience measurer 216 receives an audience measurement log indicative of one or more commercial identifiers and one or more times of presentation of one or more commercials. For example, the audience measurement entity 110 could receive the audience measurement log from the media presentation device 106 and/or the metering device 108 via the network 104. In some such examples, the audience measurer 216 receives the streaming session from the SSP 102 via the network 104. Further, in such examples, the comparing of block 306 can include identifying the streaming session from one or more streaming sessions in the streaming session log based on the one or more commercial identifiers and the one or more times of presentation indicated by the audience measurement log.

At block 310, the example panelist matcher 220 associates a panelist identifier related to the media presentation device with a streaming session identifier related to the streaming session (identified at block 308). For example, the panelist matcher 220 associates records in the panelist data repository 226 (e.g., demographic information, media viewing patterns, etc.) having the panelist identifier of a panelist that operates the media presentation device 106 with the streaming session identifier provided in the streaming session log received from the SSP 102.

Thus, in some examples, the panelist data extractor 222 retrieves information associated with a user of the media presentation device based on the panelist identifier associated with the streaming session log.

The example method 300 (e.g., the audience measurement entity 110, etc.) can be implemented to provide panelist information to the SSP 102 that is specific to a panelist (e.g., via data stored in the repository 226) by matching the streaming session identifier with a particular panelist identifier.

FIG. 4 is another flowchart representative of machine readable instructions 400 that may be executed to implement the example panelist analyzer 200 of FIG. 2.

At block 402, the SSP application prober 224 determines a player identifier for an instance of the SSP application 213 running on the media presentation device 106.

In a first example, the media presentation device 106 (and/or metering device 108) implements a probing tool (e.g., a software tool provided by the SSP 102 and installed at the media presentation device 106 and/or the metering device 108) with the example application prober 224 to retrieve the player identifier from the SSP application 213.

In a second example, the SSP 102 generates the player identifier by utilizing system configuration parameters (e.g., IP address, device model, operating system version, device hardware configuration, etc.) to implement the example application prober 224. Similarly, the media presentation device 106 and/or the metering device 108 could generate the same player identifier.

In a third example, the media presentation device 106 (and/or metering device 108) obtains the player identifier to implement the example application prober 224 by submitting a request (e.g., via the SSP application 213) for pre-generated media content (e.g., a URL) that is specific to a user of the media presentation device 106 (e.g., unique URL presented to the user, etc.). Subsequent streaming sessions from that same media presentation device and/or an instance of the SSP application 213 can be associated with a unique player identifier.

At block 404, the log analyzer 218 of the illustrated example accesses a session streaming log from the SSP 102. For example, the audience measurement entity 110 receives a listing of streaming sessions (e.g., the streaming session log) from the SSP 102 and/or the SSP data repository 228.

At block 406, the example panelist matcher 220 associates a panelist identifier related to the media presentation device 106 with a streaming session identifier related to the streaming session based on the player identifier. For example, the audience measurement entity 110 associates a panelist identifier of a user of measurement device 106 with streaming session identifiers of streaming sessions (e.g., in a streaming session log received from SSP 102) that were accessed using the SSP application 213 that is identified by the player identifier.

In a first example in which the player identifier is determined via a probing tool, the player identifier is transmitted (e.g., by the metering device 108 and/or the media presentation device 106) via the network 104 to the audience measurement entity 110. In turn, the audience measurement entity 110 matches the player identifier against player identifiers of streaming sessions indicated in the streaming session log received by the audience measurement entity 110 from the SSP 102.

In a second example in which the player identifier is determined based on a pre-generated media clip specific to a user of the media presentation device 106, the SSP 102 provides the streaming session log with a listing of streaming sessions that were accessed using the instance of the SSP application 213 that requested the pre-generated media clip.

In a third example in which the player identifier is determined based on one or more system configuration parameters of the media presentation device 106 and/or the metering device 108, the audience measurement entity 110 identifies which user device has the system configuration parameters indicated by the player identifier in the streaming session log received from the SSP 102.

At block 408, the panelist data extractor 222 provides panelist information associated with the panelist identifier to the SSP 102. For example, the audience measurement entity 110 extracts panelist information from a database (e.g., panelist data repository 226), such as demographic information, etc. of a user of the media presentation device 106, and provides the extracted panelist information to the SSP 102 (e.g., via the network 104).

Figure 5:
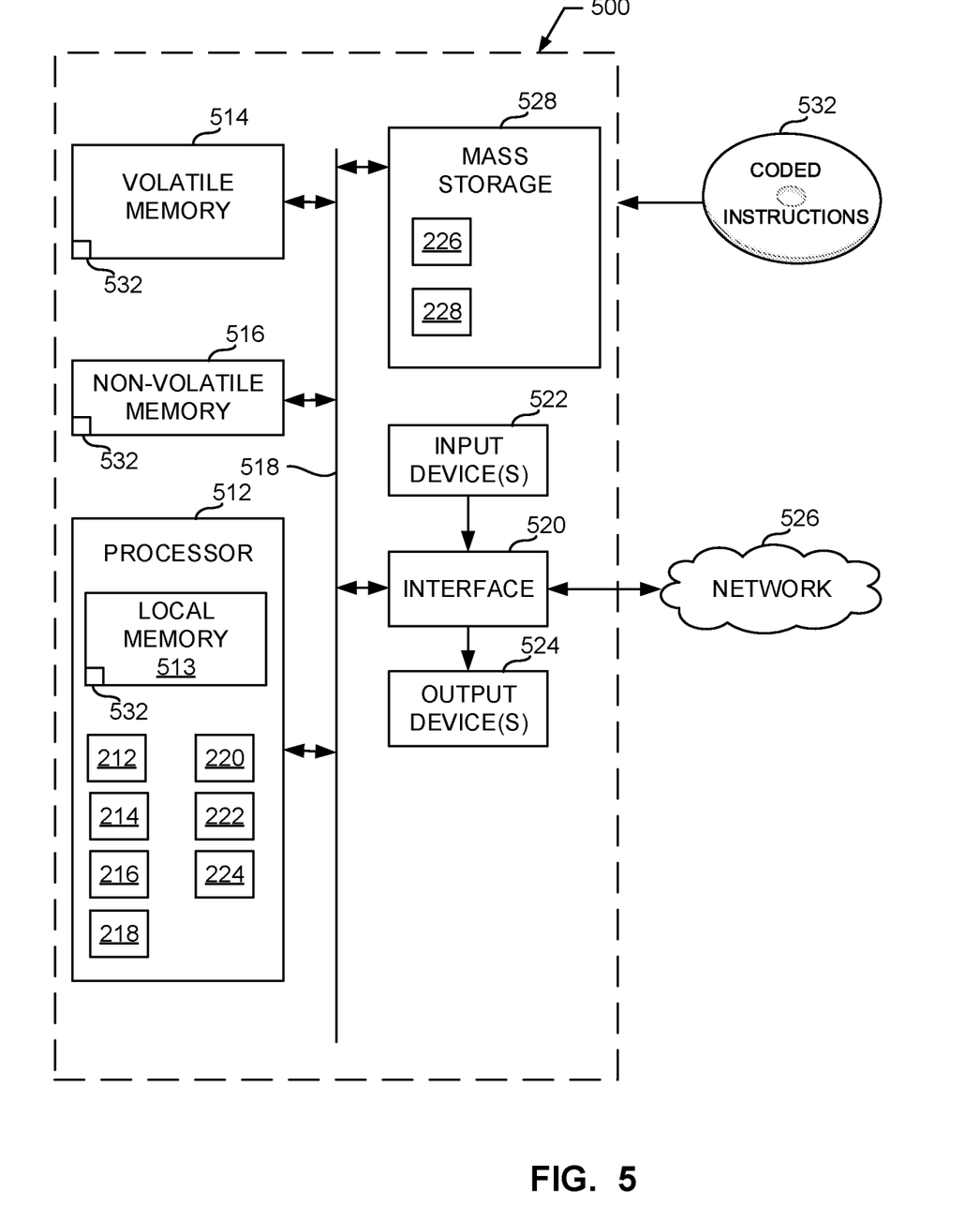
FIG. 5 is a block diagram of an example processing platform structured to execute the instructions of FIGS. 3 and/or 4 to implement one or more devices of the example environment of FIG. 1 and/or the example panelist analyzer of FIG. 2.

FIG. 5 is a block diagram of an example processor platform 500 structured to execute the instructions of FIGS. 3-4 to implement one or more of the SSP 102, the media presentation device 106, the metering device 108, the audience measurement entity 110, and/or the streaming session linker 210 of FIGS. 1-2. The processor platform 500 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example media presenter 212, the example commercial detector 214, the example audience measurer 216, the example log analyzer 218, the example panelist matcher 220, the example panelist data extractor 222, and the example SSP application prober 224.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device (s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or a speaker. The interface circuit 220 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-sight wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives. In this example, the mass storage 528 additionally includes the panelist data repository 226 and the SSP data repository 228.

The machine executable instructions 532 of FIGS. 3-4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that effectively link streaming session identifiers of a streaming session provider with panelist identifiers of an audience measurement entity. The disclosed methods, apparatus and articles of manufacture improve the efficiency of using a computing device by securely and selectively associating user information managed by an audience measurement entity with streaming session information managed by a streaming session provider. Thus, the disclosed methods, apparatus and articles of manufacture are accordingly directed to one or more improvement(s) in the functioning of a computer.

Example methods, apparatus, systems, and articles of manufacture for identifying streaming sessions are disclosed herein. Further examples and combinations thereof include:

Example 1 includes an apparatus comprising an audience measurer to determine an identifier for a commercial presented at a media presentation device, and to determine a time at which the commercial was presented, a log analyzer to compare the identifier and the time to a streaming session log from a streaming service provider (SSP) to identify a streaming session in which the commercial associated with the identifier was presented at the time, and a panelist matcher to associate, based on the comparison, a panelist identifier with a streaming session identifier corresponding to the streaming session.

Example 2 includes the apparatus of claim 1, wherein the identifier is a first identifier and the time is a first time, wherein the audience measurer is to determine a second identifier for a second commercial presented at the media presentation device, the audience measurer to determine a second time at which the second commercial was presented, and wherein the log analyzer is to identify the streaming session further based on the second identifier and the second time.

Example 3 includes the apparatus of example 1, wherein the audience measurer is to watermark the identifier.

Example 4 includes the apparatus of example 1, wherein the identifier of the commercial is based at least in part on an Internet Protocol (IP) address of the media presentation device.

Example 5 includes the apparatus of example 1, further including a panelist data repository to store information about a user of the media presentation device, and a panelist data extractor to select the panelist identifier from the panelist data repository, the panelist data extractor to provide, based on the panelist identifier, the stored information in the panelist data repository to the SSP via a network.

Example 6 includes at least one non-transitory computer readable medium comprising instructions that, when executed by at least one processor, cause the at least one processor to determine an identifier for a commercial presented at a media presentation device, determine a time at which the commercial was presented, compare the identifier and the time to a streaming session log from a streaming service provider (SSP) to identify a streaming session in which the commercial associated with the identifier was presented at the time, and based on the comparing, associating a panelist identifier with a streaming session identifier corresponding to the streaming session.

Example 7 includes the at least one non-transitory computer readable storage medium of example 6, wherein the instructions further cause the processor to determine a second identifier for a second commercial presented at the media presentation device, wherein the time is a first time, and determine a second time at which the second commercial was presented, wherein the comparing includes identifying the streaming session during which the commercial was presented at the first time and the second commercial was presented at the second time.

Example 8 includes the at least one non-transitory computer readable storage medium of example 6, wherein the instructions further cause the processor to watermark the identifier.

Example 9 includes the at least one non-transitory computer readable storage medium of example 6, wherein the instructions further cause the processor to receive, via a network, an audience measurement log indicative of one or more commercial identifiers and one or more times of presentation of one or more commercials presented at the media presentation device, and receive, from the SSP and via the network, the streaming session log, wherein the streaming session log is indicative of one or more streaming sessions and one or more commercials presented during the one or more streaming sessions, and wherein the comparing includes identifying the streaming session from the one or more streaming sessions of the streaming session log based on the one or more commercial identifiers and the one or more times of presentation indicated by the audience measurement log.

Example 10 includes the at least one non-transitory computer readable storage medium of example 9, wherein the audience measurement log is received from the media presentation device.

Example 11 includes the at least one non-transitory computer readable storage medium of example 9, wherein the audience measurement log is received from a metering device associated with the media presentation device.

Example 12 includes the at least one non-transitory computer readable storage medium of example 6, wherein the identifier of the commercial is based at least in part on an Internet Protocol (IP) address of the media presentation device.

Example 13 includes the at least one non-transitory computer readable storage medium of example 6, wherein the instructions further cause the processor to retrieve, from data storage based on the panelist identifier, information pertaining to a user of the media presentation device, and based on the associating the panelist identifier with the streaming session identifier, provide the retrieved information to the SSP via a network.

Example 14 includes a method comprising determining an identifier for a commercial presented at a media presentation device, determining a time at which the commercial was presented, comparing the identifier and the time to a streaming session log from a streaming service provider (SSP) to identify a streaming session in which the commercial associated with the identifier was presented at the time, and based on the comparing, associating a panelist identifier with a streaming session identifier corresponding to the streaming session.

Example 15 includes the method of example 14, further including determining a second identifier for a second commercial presented at the media presentation device, wherein the time is a first time, and determining a second time at which the second commercial was presented, wherein the comparing includes identifying the streaming session during which the commercial was presented at the first time and the second commercial was presented at the second time.

Example 16 includes the method of example 14, further including watermarking the identifier.

Example 17 includes the method of example 14, further including receiving, via a network, an audience measurement log indicative of one or more commercial identifiers and one or more times of presentation of one or more commercials presented at the media presentation device, and receiving, from the SSP and via the network, the streaming session log, wherein the streaming session log is indicative of one or more streaming sessions and one or more commercials presented during the one or more streaming sessions, and wherein the comparing comprises identifying the streaming session from the one or more streaming sessions of the streaming session log based on the one or more commercial identifiers and the one or more times of presentation indicated by the audience measurement log.

Example 18 includes the method of example 17, wherein receiving the audience measurement log includes receiving the audience measurement log from the media presentation device.

Example 19 includes the method of example 17, wherein receiving the audience measurement log includes receiving the audience measurement log from a metering device associated with the media presentation device.

Example 20 includes the method of example 14, wherein the identifier of the commercial is based at least in part on an Internet Protocol (IP) address of the media presentation device.

Example 21 includes the method of example 14, further including retrieving, from data storage based on the panelist identifier, information pertaining to a user of the media presentation device, and based on the associating the panelist identifier with the streaming session identifier, providing the retrieved information to the SSP via the network.

Example 22 includes an apparatus comprising means for determining an identifier for a commercial presented at a media presentation device and for determining a time at which the commercial was presented, means for comparing the identifier and the time to a streaming session log from a streaming service provider (SSP) to identify a streaming session in which the commercial associated with the identifier was presented at the time, and means for associating, based on the comparison, a panelist identifier with a streaming session identifier corresponding to the streaming session.

Example 23 includes a method comprising receiving a streaming session log from a streaming session provider (SSP), wherein the streaming session log is indicative of a streaming session presented at a media presentation device, determining a player identifier for the media presentation device, and based on the player identifier, associating a panelist identifier with a streaming session identifier corresponding to the streaming session.

Example 24 includes the method of example 23, wherein determining the player identifier includes receiving the player identifier from the media presentation device via a network, and wherein the media presentation device obtains the player identifier from a SSP application running on the media presentation device using a probing tool.

Example 25 includes the method of example 24, further including providing the probing tool to the media presentation device via the network.

Example 26 includes the method of example 23, further including providing, to a SSP application running on the media presentation device, instructions for retrieving pre-generated media content associated with a user of the media presentation device from the SSP, and identifying, from the streaming session log, a particular streaming session associated with the pre-generated media content, wherein determining the player identifier is based on the identifying the particular streaming session.

Example 27 includes the method of example 26, wherein providing the instructions for retrieving the pre-generated media content comprises providing a uniform resource locater (URL) address that is predetermined for the user of the media presentation device.

Example 28 includes the method of example 23, wherein determining the player identifier comprises receiving the player identifier from the media presentation device via a network, and wherein the media presentation device generates the player identifier based on one or more system configuration parameters of the media presentation device.

Example 29 includes the method of example 28, wherein the one or more system configuration parameters relate to one or more of: an internet protocol (IP) address, a device model, an operating system version, or a device hardware configuration.

Example 30 includes the method of example 23, wherein the player identifier identifies an instance of a SSP application running at the media presentation device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   machine readable instructions; and
   processor circuitry to at least one of instantiate or execute the machine readable instructions to:
      generate a media clip that is distinct to a media device;
      in response to a presentation of the media clip on the media device via a streaming service provider (SSP) application, associate the media device to the SSP application;
      provide instructions, via a network interface, to an SSP to watermark commercials with respective identifiers;
      provide at least one of the commercials and the media clip to the SSP application;
      determine a time at which an identifier of a first one of the commercials is presented at the media device based on meter data obtained from a metering device via the network interface;
      compare the identifier of the first one of the commercials and the time the first one of the commercials is presented at the media device to a streaming session log obtained from the SSP via the network interface to identify a streaming session in which the first one of the commercials associated with the identifier was presented at the time; and
      associate, based on the identified streaming session and the association of the media device to the SSP application, a panelist identifier with a streaming session identifier corresponding to the identified streaming session.

2. The apparatus of claim 1, wherein the identifier is a first identifier and the time is a first time,
   wherein the processor circuitry is to execute the instructions to:
   determine a second time at which a second identifier of a second one of the commercials is presented at the media device, and
   wherein the streaming session is identified further based on the second identifier of the second one of the commercials and the second time the second one of the commercials is presented at the media device.

3. The apparatus of claim 1, wherein the processor circuitry is to execute the instructions to watermark the identifier.

4. The apparatus of claim 1, wherein the identifier of the first one of the commercials is based at least in part on an Internet Protocol (IP) address of the media device.

5. The apparatus of claim 1, wherein the processor circuitry is to execute the instructions to:
   store information about a user of the media device;
   select the panelist identifier from the stored information; and
   provide, based on the panelist identifier, the stored information to the SSP via a network.

6. The apparatus of claim 1, wherein the processor circuitry is to execute the instructions to compare the identifier of the first one of the commercials and the time the first one of the commercials is presented at the media device to the streaming session log based on a time error threshold of less than five percent.

7. The apparatus of claim 1, wherein processor circuitry is to execute the instructions to direct the SSP to watermark the first one of the commercials.

8. At least one non-transitory computer readable medium comprising instructions that, when executed by at least one processor, cause the at least one processor to:
   generate a media clip that is distinct to a media device;
   in response to a presentation of the media clip on the media device via a streaming service provider (SSP) application, associate the media device to the SSP application;
   provide instructions, via a network interface, to an SSP to watermark commercials with respective identifiers;
   provide at least one of the commercials and the media clip to the SSP application;
   determine a time at which an identifier of a first one of the commercials is presented at the media device based on meter data obtained from a metering device via the network interface;
   compare the identifier of the first one of the commercials and the time the first one of the commercials is presented at the media device to a streaming session log obtained from the SSP via the network interface to identify a streaming session in which the first one of the commercials associated with the identifier was presented at the time; and
   based on the comparison the identified streaming session and the association of the media device to the SSP application, associate a panelist identifier with a streaming session identifier corresponding to the identified streaming session.

9. The at least one non-transitory computer readable storage medium of claim 8, wherein the instructions further cause the processor to:
   determine a second time at which a second identifier of a second one of the commercials is presented at the media device, wherein the time is a first time, wherein the comparison includes identifying the streaming session during which the first one of the commercials was presented at the first time and the second one of the commercials was presented at the second time.

10. The at least one non-transitory computer readable storage medium of claim 8, wherein the instructions further cause the processor to watermark the identifier.

11. The at least one non-transitory computer readable storage medium of claim 8, wherein the instructions further cause the processor to:
    receive, via the network interface, an audience measurement log indicative of one or more commercial identifiers and one or more times of presentation of commercials presented at the media device; and
    receive, from the SSP and via the network interface, the streaming session log, wherein the streaming session log is indicative of one or more streaming sessions and the commercials presented during the one or more streaming sessions, and wherein the comparing includes identifying the streaming session from the one or more streaming sessions of the streaming session log based on the one or more commercial identifiers and the one or more times of presentation indicated by the audience measurement log.

12. The at least one non-transitory computer readable storage medium of claim 11, wherein the audience measurement log is received from the media device.

13. The at least one non-transitory computer readable storage medium of claim 11, wherein the audience measurement log is received from a metering device associated with the media device.

14. The at least one non-transitory computer readable storage medium of claim 8, wherein the identifier of the first one of the commercials is based at least in part on an Internet Protocol (IP) address of the media device.

15. The at least one non-transitory computer readable storage medium of claim 8, wherein the instructions further cause the processor to:
retrieve, from data storage based on the panelist identifier, information pertaining to a user of the media device; and
based on the associating the panelist identifier with the streaming session identifier, provide the retrieved information to the SSP via the network interface.

16. A method comprising:
generating a media clip that is distinct to a media device;
in response to a presentation of the media clip on the media device via a streaming service provider (SSP) application, associating the media device to the SSP application;
providing instructions, via a network interface, to an SSP to watermark commercials with respective identifiers;
providing at least one of the commercials and the media clip to the SSP application;
determining a time at which an identifier of a first one of the commercials is presented at the media device based on meter data obtained from a metering device via the network interface;
comparing the identifier of the first one of the commercials and the time the first one of the commercials is presented at the media device to a streaming session log obtained from the SSP via the network interface to identify a streaming session in which the first one of the commercials associated with the identifier was presented at the time; and
based on the identified streaming session and the association of the media device to the SSP application, associating a panelist identifier with a streaming session identifier corresponding to the identified streaming session.

17. The method of claim 16, further including:
determining a second time at which a second identifier of a second one of the commercials is presented at the media device, wherein the time is a first time; and
wherein the comparing includes identifying the streaming session during which the first one of the commercials was presented at the first time and the second one of the commercials was presented at the second time.

18. The method of claim 16, further including watermarking the identifier.

19. The method of claim 16, further including:
receiving, via the network interface, an audience measurement log indicative of one or more commercial identifiers and one or more times of presentation of the commercials presented at the media device; and
receiving, from the SSP and via the network interface, the streaming session log,
wherein the streaming session log is indicative of one or more streaming sessions and the commercials presented during the one or more streaming sessions, and
wherein the comparing includes identifying the streaming session from the one or more streaming sessions of the streaming session log based on the one or more commercial identifiers and the one or more times of presentation indicated by the audience measurement log.

20. The method of claim 19, wherein receiving the audience measurement log includes receiving the audience measurement log from the media device.

21. The method of claim 19, wherein receiving the audience measurement log includes receiving the audience measurement log from a metering device associated with the media device.

22. The method of claim 16, wherein the identifier of the commercial is based at least in part on an Internet Protocol (IP) address of the media device.

23. The method of claim 16, further including:
retrieving, from data storage based on the panelist identifier, information pertaining to a user of the media device; and
based on the associating the panelist identifier with the streaming session identifier, providing the retrieved information to the SSP via the network interface.

* * * * *